McDUFFEE BRADFORD.
BOLL BREAKING MACHINE.
APPLICATION FILED MAY 23, 1914.

1,123,837.

Patented Jan. 5, 1915.

2 SHEETS—SHEET 1.

WITNESSES:
C. A. Ellis
R. E. C. Bruckner

INVENTOR
M. Bradford
BY
John M. Spellman
ATTORNEYS

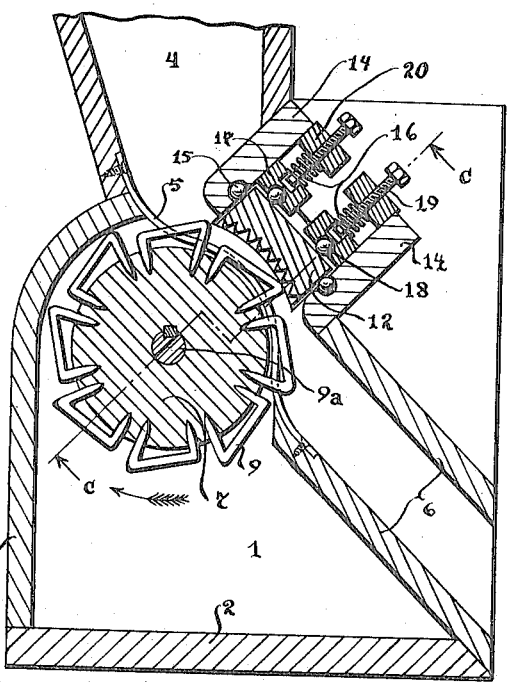
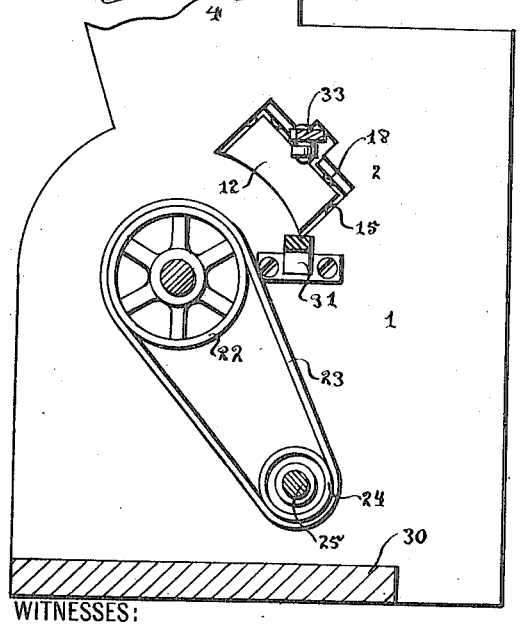

UNITED STATES PATENT OFFICE.

McDUFFEE BRADFORD, OF NOCONA, TEXAS.

BOLL-BREAKING MACHINE.

1,123,837.     Specification of Letters Patent.     Patented Jan. 5, 1915.

Application filed May 23, 1914. Serial No. 840,623.

*To all whom it may concern:*

Be it known that I, McDUFFEE BRADFORD, a citizen of the United States, residing at Nocona, in the county of Montague and State of Texas, have invented certain new and useful Improvements in Boll-Breaking Machines, of which the following is a specification.

My invention relates to new and useful improvements in boll breaking machines, and its object is to provide a boll breaking machine that may be placed in any vacuum box or separator and will without any adjustment handle either good cotton or bolly cotton, the bolls being thoroughly mashed and broken in passing through my machine.

It is another object of my invention to provide a boll breaking machine that will quickly and efficiently break up the outer pod of a boll without breaking the inner lining thereof, so that the quality or grade of the cotton will not be lessened by its treatment in my machine.

A still further object of my invention is to provide a device of the character described that will be strong, durable, efficient and simple and comparatively inexpensive to produce, also one in which the several parts will not be likely to get out of working order.

Figure 2:
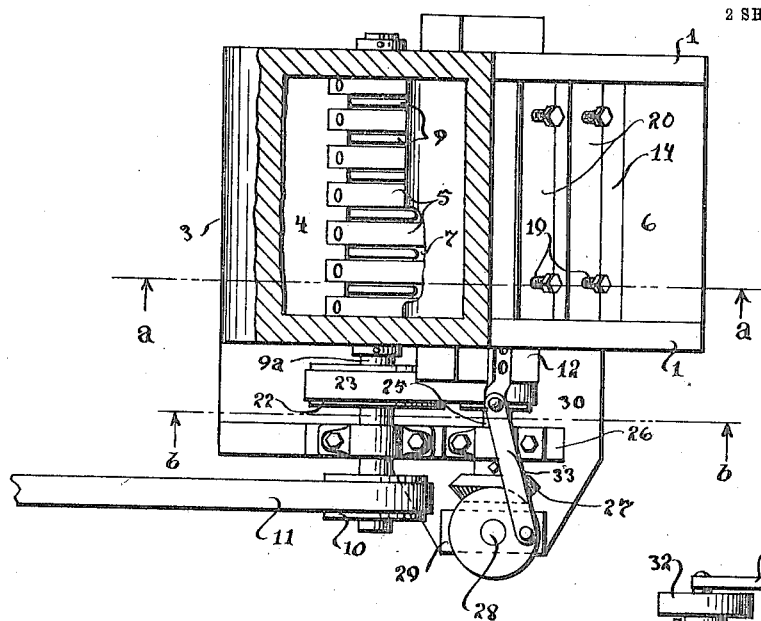
Figure 1:
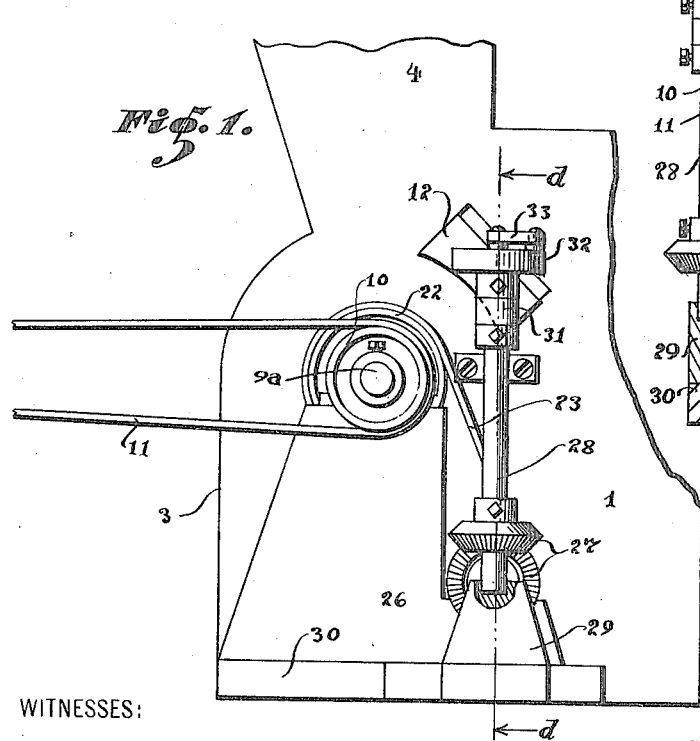
Figure 3:
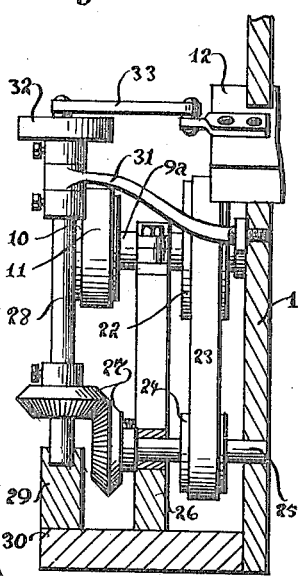

With the above and other objects in view, the invention has relation to certain features of construction and operation, an example of which is described in the following specification and illustrated in the accompanying drawings, wherein:

Figure 1 is a view of my machine in end elevation. Fig. 2 is a plan view of the same, the feed hopper being broken away. Fig. 3 is a transverse vertical sectional view taken upon the line *a—a* of Fig. 2. Fig. 4 is a transverse vertical sectional view, taken upon the line *b—b* of Fig. 2. Fig. 5 is a fragmentary sectional view taken upon the line *c—c* of Fig. 3. Fig. 6 is a longitudinal vertical sectional view taken upon the line *d—d* of Fig. 1.

Referring now more particularly to the drawings, wherein like reference characters designate similar parts in all the figures, the numerals 1, 2 and 3 respectively denote the sides, bottom and back of a casing containing the mechanism of my boll breaker. A seed hopper 4 of the usual type is adapted to discharge material into the top of the casing, the width of the hopper being equal to that of the casing. From the rear wall of the hopper 4, a plurality of slightly spaced curved ribs 5 extend downwardly at a forward inclination, and have their lower extremities rigidly secured to the bottom of chute 6 extended between the side walls 1, and inclining downwardly at a forward inclination, the lower end of said chute being flush with the front of my machine and being open. A drum 7 is longitudinally mounted in the upper rear portion of the casing, and fits into the concavity formed by the upward curvature of the ribs. A plurality of staples 9 are driven into the cylindrical face of the drum forming series of equidistant circles, each staple being formed of three rectilinear parts, two of which enter the drum, while the third is spaced from the drum surface. The drum 7 is mounted fast upon a shaft 9$^a$ having its ends journaled in the end walls of the casing, one of said ends being extended some distance beyond the casing to receive a pulley 10, upon which a belt 11 travels to drive the drum. Each circular series of staples 9 will project between two of the ribs 5 while traversing the upper portion of its rotary path. The direction of rotation communicated to the drum 7 is indicated by the arrow in Fig. 3.

A bar 12 is extended between the walls 1 above the ribs 5, the under face of said bar having a curvature corresponding to that of the middle portions of the ribs from which it is spaced slightly. The concave under surface of the bar 12 is serrated as is clearly shown in Figs. 3 and 5. The member is adapted to undergo a certain sliding displacement to or from the ribs 5, and in this displacement it is guided by two cross pieces 14 extending between the walls 1 and disposed above and below said members 12. Ball bearings are interposed between the member 12 and the cross pieces 14, the balls 15 being disposed in two grooves oppositely and longitudinally formed in the bars 14. A pressure acting toward the ribs 5 is exerted upon the member 12 by four coiled springs 16 arranged in two pairs, each pair acting upon the extremities of a bar 17 formed with a longitudinal groove in its under face to receive a set of balls 18 bearing upon the top surface of the member 12. Each spring 16 is coiled upon the lower portion of a screw 19, and each pair of screws 19 is threaded into a cross bar 20 extending between the walls 1 and rigidly secured to said walls. The springs 16 being under compression between the cross bars 20 and the members 17 exert upon said member 17 a pressure acting toward the adjacent ribs. The member 12 is maintained spaced from said ribs however and from the staples projecting between the ribs by the engagement of its end portions in apertures 21 formed in the walls 1. These apertures while limiting the motion of the member 12 toward the ribs, are so proportioned as to permit said member 12 to undergo a limited displacement from the ribs.

The projecting end portion of the shaft 9ª upon which the pulley 10 is mounted carries also a pulley 22. From this pulley, a belt 23 runs to a smaller pulley 24 mounted fast upon a shaft 25, having one of its extremities journaled in the adjacent wall 1 and the other journaled in a bearing carried by a standard 26. A pair of intermeshing miter gears 27 serve to communicate rotation from the shaft 25 to a vertical shaft 28, the lower end of which is provided with a thrust bearing 29 mounted upon a platform 30 projecting from the adjacent wall 1. The upper extremity of the shaft 28 is provided with a bearing carried by an arm 31 projecting rigidly from the adjacent wall 1 (see Fig. 6). The shaft 28 extends at its upper end slightly above the bracket 31 to receive a crank wheel 32 from which a pitman 33 is extended to the adjacent end of the member 12.

The various structural features of my invention having been above fully described, an explanation will now be given as to the operation of the device.

When the drum 7 is subjected to rotation in the direction of the arrow shown in Fig. 3, the staples 9, projecting above the ribs 5, will engage the cotton bolls and cotton that are being fed into the hopper 4 and will force the same across the reciprocating member 12 into the chute 6. The minimum space intervening between the member 12 and the ribs 5 is such that the bolls in passing through such space will be crushed and will be stripped of their pods as they are rolled against the serrated lower face of the member 12 during the reciprocating motion of said member. The bolls when once engaged between the member 12 and the ribs 5 tend to follow the member 12 in its reciprocatory motion, but the members 9 overcome this tendency, holding the bolls while the teeth of the member 12 crush them and strip them of their pods. In case material is fed too rapidly into the hopper 4, it may tend to pack between the member 12 and the ribs 5, and in order that the operation of the machine may not be obstructed under such conditions, the member 12 is so mounted that it may shift away from the ribs 5 when acted upon by a pressure sufficient to overcome the springs 16. When the member 12 is properly spaced from the ribs 5 and from the teeth projecting through said ribs, the cotton bolls will be thoroughly crushed as they are fed through my machine but the thin interior lining of the bolls which protects the fiber of the cotton remains unbroken and therefore the quality of the staple will not suffer by its treatment in my machine.

The invention is presented as including all such modifications and changes as properly come within the scope of the following claims.

What I claim is:

1. A boll breaking machine, comprising a series of slightly spaced parallel ribs, a drum revolubly mounted adjacent to said ribs, its axis of rotation being transverse with the ribs, a plurality of projections carried by the cylindrical face of the drum, and projecting between the ribs during a certain portion of their rotary motion, a reciprocatory member spaced from the ribs, the latter being passed between said member and the drum, means actuating the reciprocatory member, and means for discharging material into the space intervening between the reciprocatory member and the ribs.

2. A boll breaking machine, comprising a series of slightly spaced parallel ribs, a drum revolubly mounted adjacent to said ribs, its axis of rotation being transverse with the ribs, a plurality of projections carried by the cylindrical face of the drum, and projecting between the ribs during a certain portion of their rotary motion, a spring pressed reciprocatory member spaced from the ribs, the latter being passed between said member and the drum, means actuating the reciprocatory member, and means for discharging material into the space intervening between the reciprocatory member and the ribs.

3. A boll breaking machine, comprising a series of slightly spaced parallel ribs, a drum mounted adjacent to said ribs, its axis being transverse of the same, a plurality of projections carried by the cylindrical face of the drum and extending through the spaces between the ribs in a certain portion of their rotary motion, a concave member extending transversely of the ribs and spaced slightly from the same, the ribs being extended between said member and the drum, means guiding said member in a sliding movement to or from the ribs, springs exerting upon said member a pressure toward the ribs, bars transmitting the pressure of said springs to said member, bolts upon which the springs are mounted, bars in which the bolts are mounted, and means for communicating a reciprocatory motion to said member.

In testimony whereof I have signed my name to this specification in the presence of two subscribing witnesses.

McDUFFEE BRADFORD.

Witnesses:
B. B. WILSON,
C. D. DONALD.

Copies of this patent may be obtained for five cents each, by addressing the "Commissioner of Patents, Washington, D. C."